United States Patent [19]
Lamb, Jr.

[11] 3,771,173
[45] Nov. 13, 1973

[54] ARTIFICIAL HEART

[75] Inventor: Everette Lamb, Jr., Tyler, Tex.

[73] Assignee: James W. Fair, Tyler, Tex.; a part interest

[22] Filed: June 9, 1971

[21] Appl. No.: 151,282

[52] U.S. Cl..................... 3/1, 3/DIG. 2, 128/DIG. 3, 317/139
[51] Int. Cl. .............................................. A61f 1/24
[58] Field of Search............................. 3/1, DIG. 2; 128/1 R, DIG. 3, 214, 419 P, 421, 422

[56] References Cited
UNITED STATES PATENTS

| | | | |
|---|---|---|---|
| 3,379,191 | 4/1968 | Harvey.................................... | 3/1 X |
| 2,888,877 | 6/1958 | Shellman et al. .................. | 3/DIG. 2 |

OTHER PUBLICATIONS

"Solenoid Design For A Prosthetic Heart" by D. Freebairn et al., Transactions Amer. Soc. Artif. Int. Organs, Vol. X, 1964 pp. 166–170.

Primary Examiner—Richard A. Gaudet
Assistant Examiner—Ronald L. Frinks
Attorney—Newton, Hopkins & Ormsby

[57] ABSTRACT

An artificial heart capable of acting as a substitute for a natural heart comprising a casing constructed of a material compatible with tissue of a living being and of a size to fit within the chest cavity of a living being after removal of the natural heart. Tube means are provided on the casing for connection to the natural blood vessels of the living being with valve means operatively associated with the tube means for controlling the flow of blood therethrough. The casing includes a pair of cavity portions capable of functioning as the two ventricles of the natural heart, with independent diaphragm means operatively associated with each cavity portion. A pressure plate is reciprocally mounted in each cavity portion and is operatively associated with the diaphragm means for effecting a pumping action of blood through the tube means and into the blood vessel in simulation of the natural heart. A single reciprocally operable solenoid means is operatively associated with the two pressure plates for simultaneously effecting operation of each pressure plate in a pumping operation. The heart is cyclically controlled by a pulser operable power pack adapted to be worn by the living being externally of the body. The power pack includes control means adapted to be connected through input supply lines to the solenoid means for controlling the cyclic rate of the pumping operation.

7 Claims, 4 Drawing Figures

PATENTED NOV 13 1973 3,771,173
SHEET 1 OF 4

INVENTOR
EVERETTE LAMB, JR.

BY: Newton, Hopkins, & Ormsby
ATTORNEYS

ARTIFICIAL HEART

BACKGROUND OF THE INVENTION

This invention relates to a man-made heart. More particularly, this invention is directed to an implantable artificial heart construction and a power control unit adapted to be worn externally of a living being and operable for conducting control pulses through input supply lines to the artificial heart implanted within the chest cavity after removal of the natural heart.

The human heart is a massive muscle, undoubtedly the toughest muscle in the body. The heart has only one function, to pump blood through the circulatory system of veins and arteries to feed the body tissue picking up waste in exchange. All the tissues of the body, with the exception of the outer layers of skin and the cornea of the eyes, are fed by the new blood pumped from the heart and are relieved of their waste by the same blood.

In a normal daily operation, the heart muscle is required to perform its job many thousands of times and to pump several thousand gallons of blood through many thousands of miles of vessels. While many of our people enjoy their daily living without experiencing any heart disorder, many millions of other people, many of them otherwise healthy and in their prime of life, die of heart failure. Heart failure can result from a number of various disorders, such as blood clots or deposits in the arteries which may block a small but vital blood vessel, depriving the heart of its blood supply. In other cases, the muscle of the heart itself, fatigued by chemical or anatomic disorder, fails to respond to the demand for more blood placed by the body under stress conditions.

There have been a number of attempts made to correct the disorders of heart failure. The first breakthrough in developing mechanism for improving the operation of a defective heart included the development of heart valves which could be implanted to take the place of natural valves that had failed. The artificial valves have been successful in saving many thousands of lives.

Another step along the way toward the complete implantable heart is the development of the heart patches. The wall of the heart is formed of strong, tough muscles, but under some conditions, this powerful layer of muscle fiber may have to be strengthened. The development of a Dacron patch adapted to be sewn to the natural heart has been successful in increasing the structural strength of the natural heart enabling it to go on doing its work. A continued effort in the development of implantable artificial hearts resulted in the development of air driven booster pumps which could be employed to do the work of one part of the heart.

A number of artificial hearts have been developed which are capable of effecting a pumping action as would be required by a natural heart. However, the prior art man-made hearts are complex in construction, and unreliable in performance.

One problem in the development of an implantable artificial heart results from the heat created by the power operable means utilized to effect the pumping action of the heart.

Another problem with the prior art man-made hearts is attributed to the cyclic control means required to simulate the cyclic rate of heart beat of a natural heart.

SUMMARY OF THE INVENTION

The above disadvantages of the prior art man-made hearts have been overcome by the present invention which basically includes a casing constructed of material compatible with the tissue of a living being and of a size to fit within the chest cavity of the living being and having tube means adapted to be connected to the natural blood vessels, with pumping means and valve control means operable for simulating a circulation of blood through the valve means and tube means and into the blood vessel, with control means operable for effecting cyclic rate of pumping action which would be in accordance with the natural heart beat of the living being.

An important feature of the present invention resides in the construction of the casing to include a pair of cavity portions capable of functioning as the two ventricles of the natural heart, with each cavity portion including a diaphragm and pressure plate means reciprocally driven in a pumping operation by a single reciprocally operable power means.

Another feature of the present invention resides in the control unit which is adapted to be worn externally of the body and including input control lines adapted to be connected to the heart power operable pumping means for effecting a cyclic rate of pumping action.

The externally worn control unit includes a number of transistors electrically connected to a number of relay means with the transistors being automatically operable for generating a continuous series of signals having a predetermined length, which signals are capable of effecting a cyclic operation of the heart power operable pumping means. The control circuitry relay means includes a number of relay elements with each relay element having independent power supply means. Selectively adjustable resistor means is electrically connected with the transistor means for allowing the cyclic rate of the pumping operation to be adjusted.

It is therefore a primary object of this invention to provide an artificial heart capable of acting as a substitute for a natural heart.

Another object of this invention is to provide a casing constructed of a material compatible with the tissue of a living being of a size to fit within the chest cavity of a living being after removal of the natural heart.

A further object of this invention is to provide tube means adapted to be connected to the natural blood vessels of a living being and having valve means operatively associated therewith for controlling the flow of blood therethrough.

A still further object of this invention is to provide pumping means operatively associated with an artificial heart for circulating blood through the blood vessels of a living being in simulation of the natural heart.

Yet another object of this invention is to provide a power control unit adapted to be worn externally of a living being for controlling the cyclic rate of pumping action of an artificial heart.

A further object of this invention is to provide electrical circuitry means for automatically generating a continuous series of signals for controlling the cyclic rate of power operable pumping means for an artificial heart.

Another object of this invention is to provide a pulser unit for an artificial heart which includes selectively adjustable control means for varying the cyclic rate of the heart pumping action.

A still further object of this invention is to provide electrical circuitry for controlling the cyclic rate of a pumping action of an artificial heart with means for controlling the width of an operating signal transmitted thereby.

Yet another object of this invention is to provide a control circuitry for an artificial heart utilizing DC voltage and being automatic in its operation.

An additional object of this invention is to provide an artificial heart with control means therefore which is simple in construction and operation, economical to manufacture and reliable in performance.

These and other objects and advantages of the details of construction will become apparent upon reading the following description of the illustrative embodiment, with reference to the attached drawing wherein like reference numerals have been used to refer to like parts throughout the several figures, and wherein:

GENERAL DESCRIPTION OF A NATURAL HEART

Figure 1:
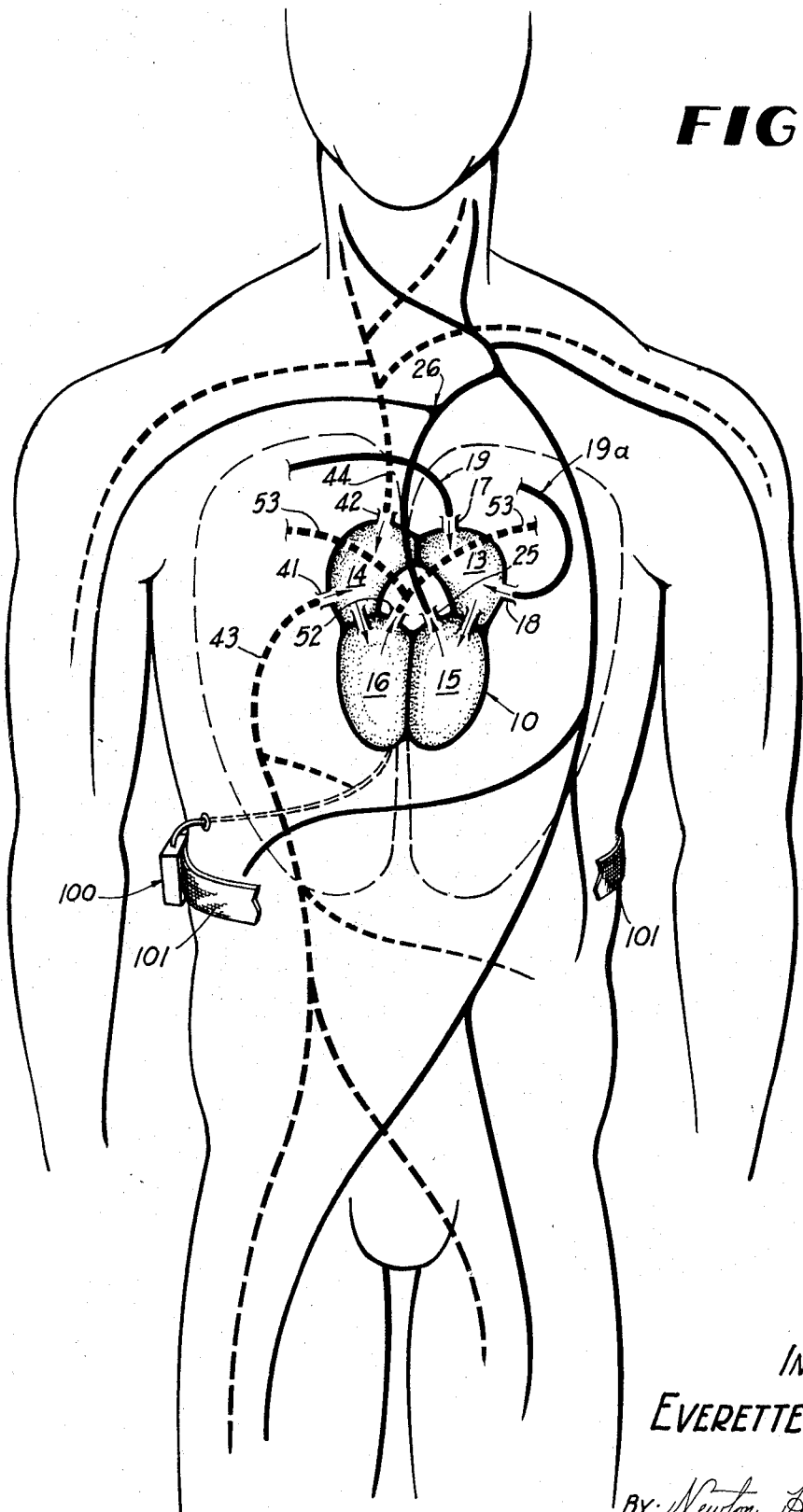
FIG. 1 is a schematic representation of the human circulatory system showing the artificial heart embodying the natural heart.

A general description of the natural heart will be given herein for the purpose of making reference thereto in the description of the artificial heart embodying the principles of the present invention, as will be described hereinbelow.

The human heart is slightly larger than one's fist, in weight it is under a pound and in shape it is somewhat like an upside down pear with the pointed end to the left. The heart is located in the chest between the lungs but extending slightly more to the left. The veins, arteries and aorta arising directly from the chest are known as the great vessels.

In the human heart a fibrous membrane encloses the heart. It is made up of two layers, the outer fibrous layer which ties into the central tendon of the diaphragm and the inner serous layer. The tough muscle forming the wall of the heart is termed myocardium and it has a lining, the endocardium. The muscle forming the heart is a special kind of a muscle. To keep it working and pumping blood through the body constantly, every second of one's life, means that it must receive a continuous supply of oxygen and food. This is received through a network of arteries within its own muscular walls known as the coronary arteries. The heart does not receive nourishment from the blood which it pumps within itself. All the blood pumped by the heart is distributed to the body or lungs and it is only from its own arterial system that it is nourished. This system starts with two main coronary arteries which arise from the aorta, just above the valves of the aorta and, as in the rest of the body, these arteries divide into smaller branches which reach every part of the heart's muscular wall.

The natural heart is divided into almost two identical halves left and right, by a muscle wall termed the septum. The heart is really nothing more than a double heart with each section serving a different circulation. The two circulations of the human body are the great or systemic and the small or pulmonary. Each half of the heart is divided into an upper chamber termed auricle and a lower chamber termed ventricle. The walls of the auricle are much thinner than the walls of the ventricle. Between the upper and lower chambers is a separating membrane having an opening through which blood flows from one chamber to the next. The opening is equipped with valves to allow the blood to flow in one direction only. The valve between the left ventricle and the left auricle is termed the mitral valve. On the right side of the heart the valve has three flanges or cusps termed the tricuspid valve. The mitral valve has two of the cusps.

While the outer surface of the heart is almost smooth, the inner surface has numerous irregular muscular cords or bands and cone-shaped muscle columns which project from the wall. The left side of the heart takes new blood from the lungs where it has received fresh oxygen through its circulation through the network of capillaries in the lungs. This blood through the freshening is bright red in color. The right side of the heart receives the blood from the veins where it is dark bluish-red in color carrying carbon dioxide and waste and pumps it to the lungs where the cycle is repeated. The blood flows from the heart through a system of arteries that divide into smaller and smaller veins on their way to the numerous organs, the arms and legs of the body and finally to the network of smaller capillaries, thin walled and miscroscopic in size. The waste is returned from the capillaries to the tiny veins in turn which develop into small veins, then large venous trunks as they return on the way to the heart. With the heart in action, fresh blood from the lungs enters the left auricle. As the left auricle is filled its walls contract, pushing blood down through the mitral valve into the left ventricle. The cusps of the mitral valve open downward into the ventricle as the blood flows therethrough. After the ventricle becomes full and wishes to both push the blood onto the next step as well as resisting the pressure of the volume of blood poured into it, it begins to contract. The pressure of the ventricle beginning to contract pushes the mitral valve cusp upward to a closed position so that blood cannot return to the auricle from which it came. At the same time the only release for the blood from the ventricle is the aorta. At the entrance to the aorta is the aortic valve which opens to permit passage of the blood from the ventricle, its cusps opening outward, then closing back to prevent backflow.

Blood which has fed the body tissues and picked up carbon dioxide and waste, turning dark in the process, passes through the venous system and is collected into two great veins, the superior vena cava which drains the head and arms, and inferior vena cava which drains the body trunk and the legs. This venous blood enters the right auricle and passes through the tricuspid valve into the right venticle, is pumped through the pulmonary valve into the pulmonary artery. The pulmonary artery divides, branching to feed the venous blood into the right and left lungs. In the lungs, the veins feed the capillaries where the blood gives up its carbon dioxide and waste to be expelled from the body by the lungs, and picks up oxygen returning through the capillaries and arteries to the heart, completing the cycle.

Each contraction of the heart is proceeded by the excitation waves of electrical activity. The heart muscle has the innate ability to contract, and can continue to beat if completely separated from its normal environment. The electrical impulse in the normal heart originates in the sinoauricular node in the right auricle and travels in wave-like fashion to the artioventricular node, another group of specialized muscle tissue located in the interventricular septum. The excitation wave next passes to the purkinjie fibers system. Activation of the ventricular muscle starts in the septum and passes to the free walls of both ventricles. It is this electrical activity of the heart muscle that is recorded when one has an electrocardiogram. This conducting system of the heart is very tiny in relation to the heart mass.

DESCRIPTION OF THE ILLUSTRATIVE EMBODIMENT

Referring now to the drawings, the artificial heart of the present invention will be described with reference to an implantable heart casing represented generally by reference numeral 10 and an externally worn heart power control unit identified by the reference numeral 100.

The function of the implantable heart 10 is to provide a casing containing pumping means and including means for connection with the natural blood vessels of the living being and being operable for pumping blood through the system of veins and arteries in simulation of the natural heart.

The function of the externally worn power control unit 100 is to provide means for furnishing power to the implantable heart 10 and to provide means for controlling the cyclic rate of pumping action of the heart, which rate is to be a simulation of the natural heart pumping action.

Figure 2:
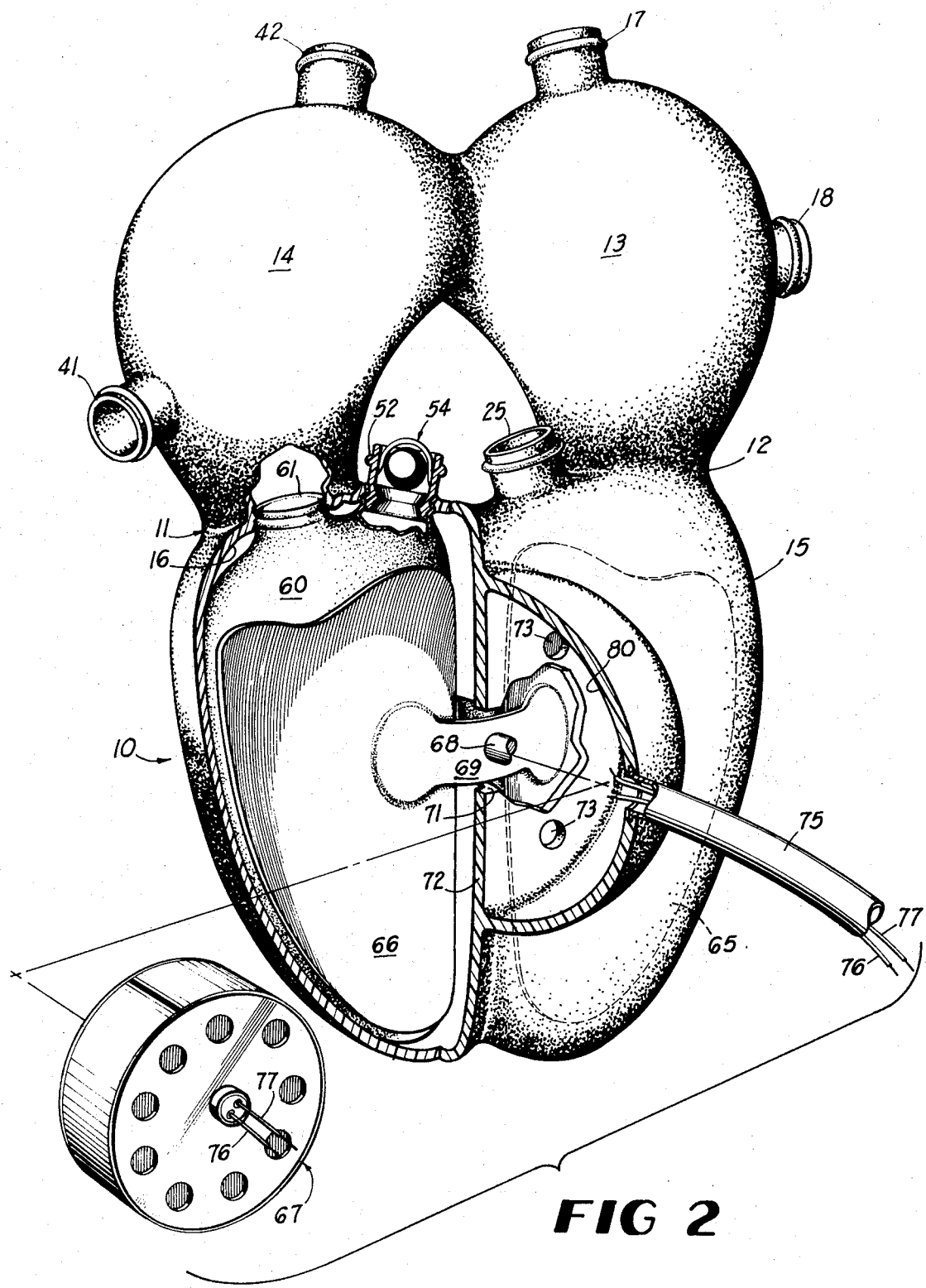
FIG. 2 is an enlarged exploded perspective view of the artificial heart of the present invention with parts broken away and shown in section for purpose of clarity.
Figure 3:
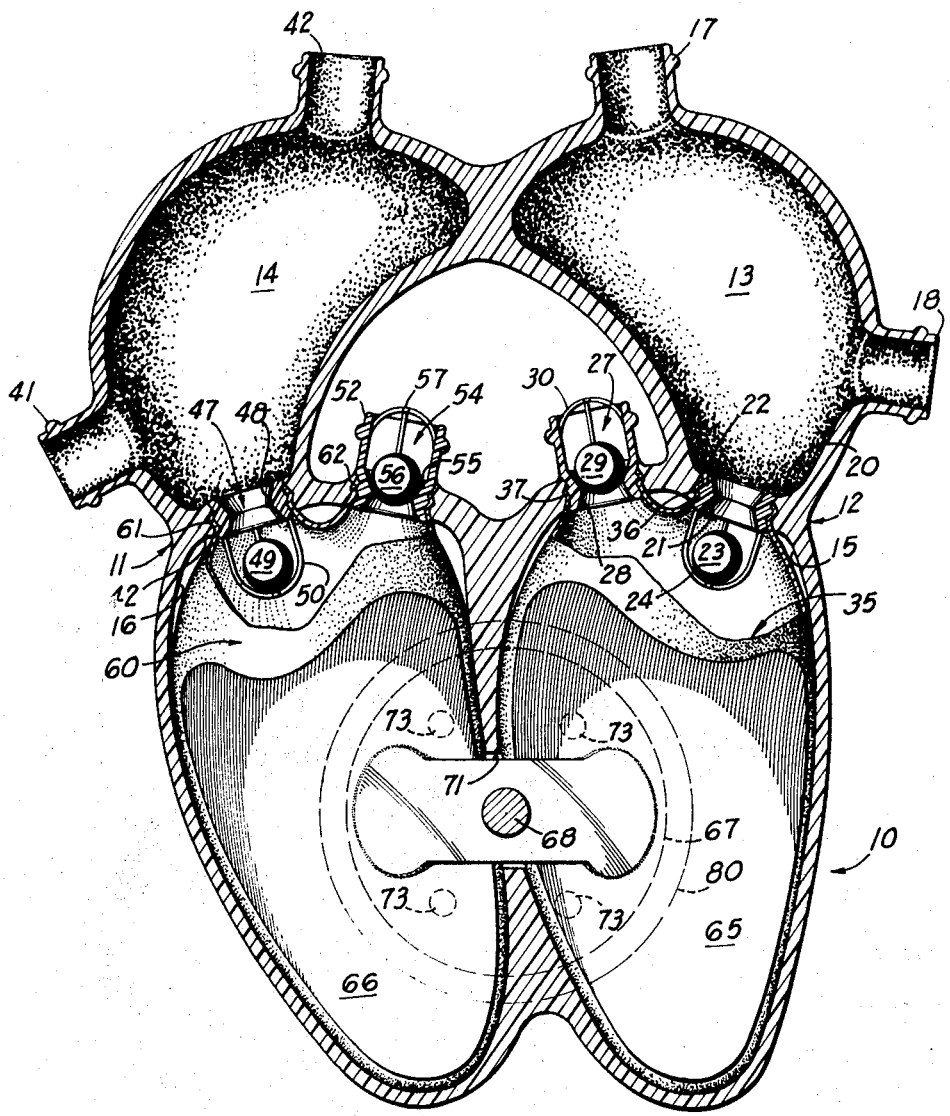
FIG. 3 is a vertical sectional view taken substantially transversely through the heart shown in FIG. 2.

As shown in FIGS. 2 and 3, the implantable artificial heart 10 is a molded casing constructed of suitable material which would be compatible with the body tissue of a living being, such as Dacron and Teflon and includes two identical halves 11, 12. The two halves 11, 12 are divided into upper chambers 13, 14 and lower chambers 15, 16. Chamber 13 is representative of the upper left auricle and chamber 14 is representative of the upper right auricle. Chamber 15 is representative of the left ventricle and chamber 16 is representative of the right ventricle. The upper left auricle chamber 13 is provided with tube means 17, 18 which are adapted to be connected to arteries 19, 19a leading from the right and left lungs, respectively. The upper left auricle chamber 13 will serve as a collection chamber for collecting the freshened blood flowing from the lungs in a manner as described above in the description of the natural heart.

As shown in FIG. 3, the upper left auricle 13 is separated from the left ventricle 15 by a wall member 20 having a valve means 21 located therein. Valve means 21 is a conventional one-way ball valve construction and includes a valve seat means 22, a spherical ball valve element 23 and a ball valve retaining element 24. Valve means 21 is operable for permitting blood to flow therethrough from the upper left auricle chamber 13 into the left ventricle chamber 15, but will operate to prevent blood from returning from the left ventricle chamber 15 into the left auricle chamber 13, in a pumping operation. In an opened position, the ball valve 23 is displaced downwardly relative to seat means 22 and is held by the ball valve retaining element 24. In a valve closed position, the spherical ball valve 23 is moved upward into engagement with the valve seat means 22 to thereby block a flow of fluid therethrough.

As shown in FIGS. 2 and 3, the upper edge of the left ventricle chamber 15 is provided with outlet tube means 25. Outlet tube means 25 is adapted to be connected to the system of arteries represented by reference numeral 26 in FIG. 1 for feeding the freshened blood to the body tissues as described above in the description of the natural heart.

The tube means 25 is provided with a conventional one way ball valve construction 27 and includes a valve seat means 28, a spherical ball valve element 29, and a ball valve retaining element 30. Valve means 27 is operable for permitting blood to flow therethrough from the left ventricle chamber 15 into the system of arteries 26, but will prevent blood from returning from the arteries 26 into the left ventricle 15. In an open position, the ball valve element 29 is displaced upwardly relative to the valve seat means 28 and is prevented from being disclosed relative to the valve means 27 by valve retaining element 30. In a valve closed position, the ball valve element 29 is moved downwardly into engagement with the valve seat means 28 to thereby block the flow of blood from the arteries into the left ventricle 15.

As shown in FIG. 3, the left ventricle chamber 15 is provided with a sack or bladder means 35. The sack or bladder means 35 is constructed of a flexible material which will permit alternate expansion and collapsing thereof in a pumping operation. The sack or bladder means 35 is detailed in construction to be substantially complementary to the inside of chamber 15. As shown in FIG. 3, the upper edge of the sack or bladder means 35 is provided with a first tubular connecting element 36. Tubular connecting element 36 is adapted to be connected around the valve means 21 and between the wall construction 20 to provide a sealing relationship between the upper left auricle chamber 13 and the inside of the sack or bladder means 35. The upper edge of the sack or bladder means 35 is provided with a second tube means 37 which is connected in sealing relationship around the valve means 27. The above described sealing relationship of the sack or bladder means 35 between valve means 21 and valve means 27 will permit blood to flow from the upper left auricle chamber 13 through the valve means 21 into the interior of the sack or bladder means 35 and will permit the blood to flow outwardly through valve means 27 in a pumping operation, as will be described in more detail hereinbelow.

As shown in FIGS. 2 and 3, the upper right auricle chamber 14 is provided with tube means 41, 42 which are adapted to be connected to veins 43, 44 leading from the network of veins returning blood with carbon dioxide and waste. The right auricle chamber 14, will serve as a collection chamber for collecting the blood containing waste flowing from the network of body veins, in a manner as described above in the description of the natural heart.

The upper right auricle chamber 14 is separated from the right ventricle chamber 16 by a small wall member 46 having valve means 47 located therein. Valve means 47 is a conventional one-way ball valve construction and includes a valve seat means 48, a spherical ball valve element 49 and a ball valve retaining element 50. Valve means 47 is operable for permitting blood to flow therethrough from the upper right auricle chamber 14 into the right ventricle 16, but will operate to prevent blood from returning from the right ventricle 16 into the upper left auricle chamber 14. In an open position, the ball valve element 49 is displaced downwardly relative to valve seat means 48 and is held by the ball valve retaining element 50. In a valve closed position, the ball valve 49 is moved upward into engagement with the valve seat means 48 to thereby block a flow of blood therethrough.

The upper edge of the right ventricle chamber 16 is provided with outlet tube means 52. Outlet tube means 52 is adapted to be connected to the pulmonary artery 53 which divides, branching to feed the venous blood into the right and left lungs, as described above in the description of the natural heart.

Tube means 52 is provided with a conventional one-way ball valve construction 54 and includes a valve seat means 55, a spherical ball valve element 56 and a ball valve retaining means 57. Valve means 54 is operable for permitting blood to flow therethrough from the right ventricle chamber 16 into the pulmonary artery 53, but will prevent blood from returning from the pulmonary artery 53 into the right ventricle 16.

As shown in FIGS. 2 and 3, the right ventricle chamber 16 is provided with a sack or bladder means 60. The sack or bladder means 60 is constructed of a flexible material which will permit alternate expansion and collapsing thereof in a pumping operation, in the same manner as indicated above in the description of the sack or bladder means 35 of left ventricle chamber 15. The sack or bladder means 60 is detailed in construction to be substantially complementary to the inside of right ventricle chamber 16. As shown in FIGS. 3, the upper edge of the sack or bladder means 60 is provided with a first tubular connecting element 61. Tubular connecting element 61 is adapted to be connected around the valve means 47 and between the wall construction 42 to provide a sealing relationship between the upper right auricle chamber 14 and the inside of the sack or bladder means 60. The upper edge of the sack or bladder means 60 is provided with a second tube means 62 which is connected in sealing relationship around the valve means 54. The above described sealing relationship of the sack or bladder means 60 between the valve means 47 and 54 will permit blood to flow from the upper right auricle chamber 14 through valve means 47 into the interior of the sack or bladder means 60 and will permit the blood to flow outwardly through the valve means 54 in a pumping operation, as will be described in more detail hereinbelow.

Referring now particularly to FIGS. 2 and 3, the left and right ventricles 15, 16 are provided with pressure plate means 65, 66, respectively. Pressure plate means 65, 66 are formed to be substantially complementary to the internal cavity portions of the ventricle chambers 15, 16 and extend from adjacent a lower edge of the ventricle upward a substantial distance, with the upper edge being spaced slightly below the valve means 21, 47, to permit operation thereof. The pressure plate means 65, 66 are detailed for overlying the sack or bladder means 35, 60, whereby an inward movement of the pressure plate means 65, 66 will effect a collapsing of the sack or bladder means 35, 60 to force blood contained therein outward through the valve means 27, 54, as described hereinabove.

Operation of the pressure plate means 65, 66 in a pumping operation is effected by means of a conventional reciprocally operable solenoid means 67. Solenoid means 67 includes a reciprocating shaft 68 extending outwardly thereof. Solenoid means 67 is supported on the outer surface of casing 10, with the shaft 68 being centered between the left and right ventricles 15, 16 and aligned with casing wall means 72 which separates the left and right ventricle.

Bridge plate element 69 includes a pair of arms which extend radially outward in opposite directions from shaft 68. Opposite ends of the bridge plate element 69 connected to the pressure plate means 65, 66, by conventional means such as welding. The wall member 72 located between left and right ventricles 15,16 is provided with a notch portion 71 which will permit a reciprocating movement of solenoid shaft 68 and bridge plate 69.

As shown in FIG. 2, the casing 10 includes a top wall means which encloses the ventricle chambers 15, 16 and overlies the pressure plate means 65,66. The casing wall means is provided with a number of openings 73 which will permit circulation of air through a tube connecting element 75 extending externally of the body. The air circulation through the tube means 75 will allow movement of the air down through opening 73 into the area above the pressure plate means during a collapsing operation of the sack or bladder means 35,66 and will permit the air currents to be directed outwardly through the openings 73 during a retraction of the pressure plate means 65, 66. The air currents circulating through openings 73 and tube 75 will aid in cooling the solenoid operating means 67. Operation of the solenoid means 67 is effected by a pair of control lines 76,77 which extend from the solenoid 67 outwardly through the tube connection means 75, as shown in FIG. 2.

A dome-shaped cover element 80 is formed on the upper surface of casing 10 to surround and completely enclose the solenoid means 67. The cover means 80 is constructed of suitable material which would be compatible with the body tissue, such as Dacron or Teflon, as indicated above in the construction of casing 10.

In a pumping operation, freshened blood flowing through arteries 19a,19 from the lungs will be allowed to enter the upper left auricle chamber 13. The blood flowing into the upper left auricle chamber 13 will flow downwardly through valve means 21 into the sack or bladder means 35. Simultaneously with the flow of blood from the lungs into the upper left auricle 13, the blood carrying carbon dioxide and waste from the body tissues will flow through the system of veins 43,44 into the upper right auricle chamber 14. The blood flowing into the upper right auricle chamber 14 will flow downwardly through valve means 47 into the sack or bladder means 60. The blood flowing from the auricle chambers 13,14 into the sack or bladder means 35,60 will effect an expansion of the sack or bladder means for containing a predetermined amount of blood.

After the sack or bladder means 35,60 have been expanded to contain a predetermined amount of blood, the solenoid means 67 will be energized to thereby force the pressure plate means 65,66 downward into the ventricle chambers 15,16. A downward movement of the pressure plates 65,66 will operate to collapse the sack or bladder means 35,36 thereby forcing the valve means 21,47 to a closed position and forcing the valve means 27,54 to an open position. Movement of the valve means 27,54 to an open position will allow the blood contained in the sack or bladder means 35,60 to flow outward through the tube means 25,52, as indicated herein above. The blood flowing outwardly through tube means 25 will flow along the system of arteries 26 to supply freshened blood to the body tissues. The blood flowing outwardly through tube means 52 will be directed through the pulmonary artery system 53 into the lungs for removing and expelling the carbon dioxide and waste.

It is apparent from the above description of the artificial heart of the present invention that the auricle collection chambers 13,14; ventricle pumping chambers 15,16; valve means 21,27,47 and 54; and, pumping means including sack or bladder means 35,60 and solenoid controlled pressure plate means 65,66 are capable of performing a pumping operation of blood through the system of veins and arteries in simulation of the natural heart, as described herein above. To effect an operation of the artificial heart 10 in manner similar to the natural heart, it is necessary to a cyclic operation of the solenoid means 67, which cyclic operation will simulate the natural heart beat.

The cyclic control of solenoid 67 and the pumping action of the artificial heart 10 is controlled by a power control unit 100 adapted to be worn externally of the body by a conventional belt connection means 101. Connection of the implantable artificial heart 10 to the externally worn power control unit 100 is made through the tube means 75.

As shown in FIG. 5, a cycle of operation of the reciprocally operable solenoid means 67 is effected by allowing current control signals to flow from the battery supply means 102 through the switch means 103 through the lead lines 76,77 and to solenoid 67. Switch means 103 is normally biased in an open non-current conduction position and is moved to a closed current conducting position by means of relay element 104. Relay element 104 is connected by lead lines 105,106 to a conventional battery supply means 107. Lead line 106 includes a conventional switch means 108 connected in series therewith. Switch means 108 is normally biased to an open non-current conducting position and is moved to a closed current conducting position by means of a relay element 110. When switch means 108 is moved to a closed current conducting position, the power from battery 107 will flow through relay element 104 to effect operation thereof and to thereby close the solenoid switch means 103.

Figure 4:
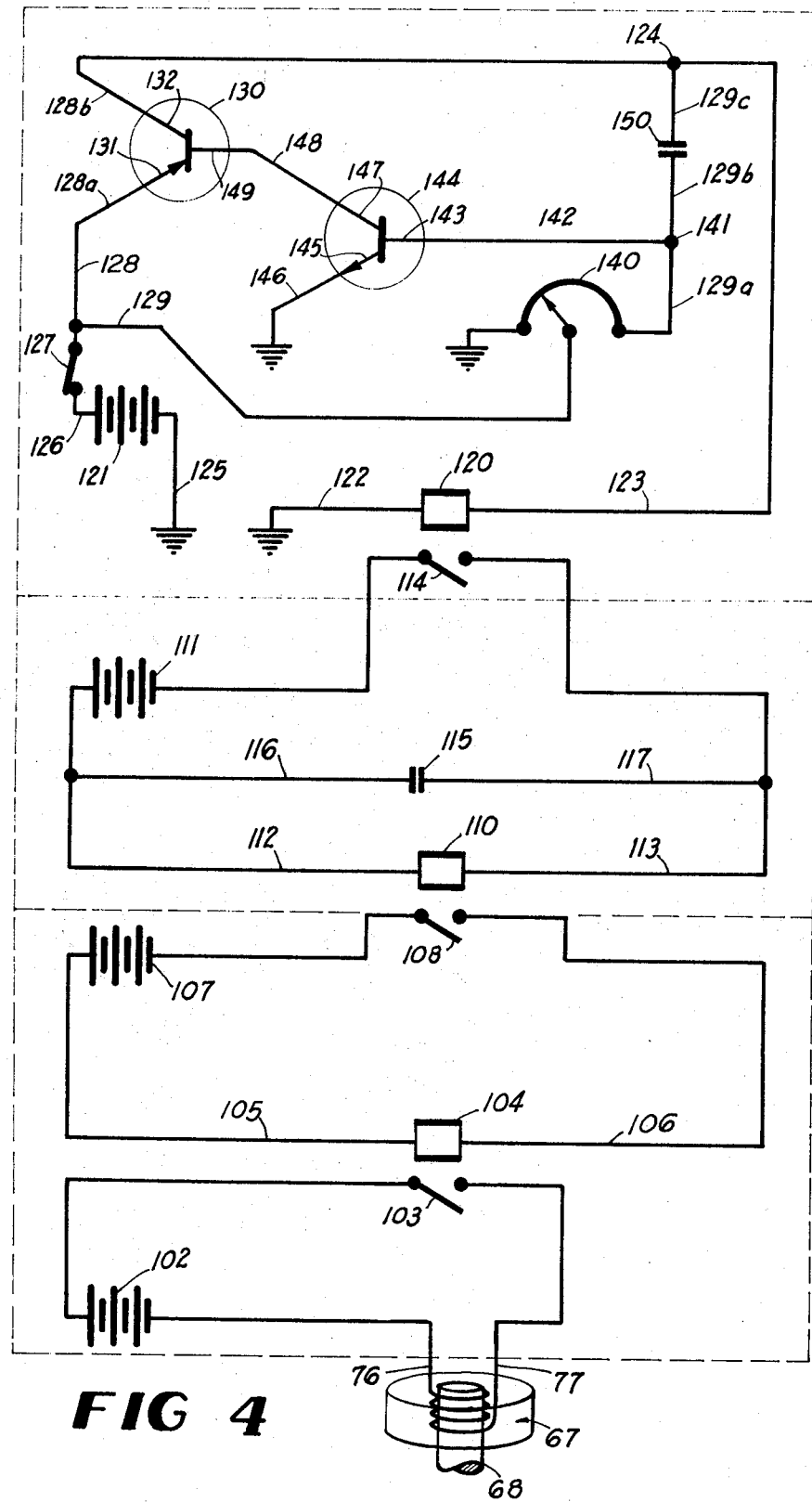
FIG. 4 is an electrical schematic diagram of the pulser control circuitry utilized in controlling the cyclic rate of pumping action of the heart.

As shown in FIG. 4, the relay element 110 is connected to a conventional battery supply means 111 by a pair of lead lines 112, 113. Lead line 113 is provided with a conventional switch means 114 connected in series therewith. Switch means 114 is normally biased to an open non-current conducting position and is moved to a closed current conducting position by operation of a relay element 120. When switch means 114 is moved to a closed current conducting position, current will be allowed to flow through lead lines 112, 113 to effect operation of the relay element 110 thereby closing switch means 108. As shown in FIG. 4, capacitor means 115 is connected by a pair of lead lines 116, 117 in parallel relationship with the relay element 110. The purpose of the parallel connection of the capacitor 115 is to provide means for ensuring that the relay element 110 will be energized for a predetermined period of time to hold the switch means 108 in a closed position for a predetermined period of time to thereby control the width of pulse transmitted to relay element 104 for effecting a closing operation of switch means 103.

As shown in FIG. 4, the relay element 120 is automatically and serially energized by a pulser control circuit from a battery supply source 121. The pulser control circuit includes a lead line 122 connected between relay element 120 and a ground source and an input supply line 123 connected between relay element 120 and a connection terminal 124. Battery supply source 121 is connected by a lead line 125 to a conventional ground means and is connected by a lead line 126 to a conventional manual control switch means 127. Power delivered through switch means 127 is transmitted along a pair of parallel arranged lead lines 128, 129 to the terminal connection point 124. A PNP transistor 130 is electrically connected in series fashion to the lead line 128, with the transistor emitter 131 being connected to input portion 128a of lead line 128 and transistor collector portion 132 being connected to output portion 128b of lead line 128. Electrical current flowing through lead line 129 will be transmitted through a selectively settable variable resistor means 140, along lead line 129a to a terminal point 141. A lead line 142 is connected to terminal point 141 adjacent one end with its opposite end being electrically connected to the base portion 143 of a NPN transistor means 144. The emitter portion 145 of NPN transistor 144 is connected by a lead line 146 to suitable ground means. The collector portion 147 of the NPN transistor 144 is connected by lead line 148 to the base portion 149 of the PNP transistor 130. As shown in FIG. 4, capacitor means 150 is electrically connected between terminal points 124 and 141 by a pair of connecting portions 129c and 129b of lead line 129.

In operation, the PNP transistor 130 is provided with a reverse bias by the application of a positive potential on the transistor base portion 149, to prevent the flow of current from the transistor emitter 131 to the transistor collector 132. The NPN transistor 144 is also electrically connected to provide a reverse bias between the transistor collector 147 and transistor emitter 145 to prevent the flow of current therethrough. In operation, the manual control switch 127 is moved to a closed condition to permit a positive electrical charge to flow along lead line 129 through the variable resistor means 140, lead line 129a, lead line 142 through the NPN transistor base 143 to thereby bias transistor 144 to a forward bias position to permit current to flow from the transistor collector 147 through the transistor emitter 145 and lead line 146 to a suitable ground means. A flow of current from the NPN transistor collector 147 through the transistor emitter 145 will operate to apply a negative potential to the base portion 149 of the PNP transistor 130. Application of a negative potential to the base portion 149 of PNP transistor 130 will operate to change the pNP transistor to a forward biased condition to permit current to flow through the PNP transistor emitter 131 out through the transistor collector 132 and along lead lines 128b to the terminal portion 124.

Current transmitted to the terminal portion 124 will flow along lead line 123 through the relay element 120, lead line 122 to the conventional ground means, to thereby effect operation of the relay element 120 for closing switch means 114. During a flow of current along lead line 129 through the variable resistor 140, lead line 129a, terminal point 141 and lead line 129b to the capacitor 150, the capacitor will be charged and will permit operation of the NPN transistor 144 from the reverse bias condition to the forward bias condition, as described above.

After current has been transmitted through the transistor means 130 along lead line 128b to the terminal point 124, the current transmitted thereto will operate to discharge capacitor 150. A discharging operation of capacitor 150 will operate to apply a negative pulse to the NPN transistor base portion 143 thereby changing the NPN transistor 144 from a forward biased condition to a reverse biased condition, to stop the flow of current from transistor 130, along lead line 149 and through the NPN transistor means 144. As the flow of current is stopped in lead line 148, the PNP transistor means 130 will again be changed to a reverse biased condition to stop the flow of current from the PNP transistor emitter 131 to the transistor collector 132. As soon as the capacitor 150 has discharged to the reverse the transistor means 130,140, as indicated above, and since the switch means 127 has remained closed, positive current will again flow along lead lines 129 through the variable resistor means 140, lead line 129a and through the terminal 141, lead line 142 to the NPN transistor means 144, to again effect a cycle of operation of the PNP transistor 130 to transmit a signal to the relay means 120.

The above described operation of the transistor means 130,144 and the capacitor means 150 will operate to automatically move between their reverse biased conditions and their forward biased conditions to permit a series of control signals to be transmitted to the relay 120 for effecting operation of switch means 114. After the manual control switch means 127 is closed for transmitting power through lead lines 128,129 the capacitor means 150 will be alternately charged and discharged to effect the operation of the transistor means 130, 144 between their reverse biased and forward biased conditions.

The variable resistor means 140 is selectively settable whereby the amount of current transmitted therethrough and along lead lines 129a and 129b to the capacitor 150 can be varied for altering the cyclic rate of operation of the transistors 130,144 and capacitor 150. The above described circuitry including battery supply source 121, manual switch 127, transistor 130, variable resistor means 140, transistor means 144, and capacitor means 150 will operate as an automatic pulser unit for automatically transmitting a series of control signals along the input supply lead lines 123 to the relay element 120. The PNP transistor 130 will operate as a conducting switch means which is normally biased to a non-conducting reverse biased condition and operable for being changed to a forward biased conducting position by applying a negative potential to the transistor base portion 149. The NPN transistor 144 will operate as a pulsating switch means which is normally biased to a reverse biased condition and is operable for moving to a forward biased condition by receiving a positive current potential on the transistor base portion 143.

The automatic series of signal control pulses transmitted to the relay element 120 will effect movement of the switch means 114 between the open and closed conditions to serially energize and de-energize relay element 110. The capacitor means 115 will operate to hold the relay element 110 in an energized position for a predetermined period of time to thereby control the pulse width transmitted through the switch means 108. The cyclic operation of the relay element 110 by alternate closing and opening of the switch means 114 will effect a corresponding opening and closing of the switch means 108 to serially energize and de-energize the relay element 104. The cyclic operation of the relay element 104 will automatically effect serial movement of the switch means 103 between opening and closed conditions to automatically transmit a series of operable control signals from the battery supply means 102 along lead lines 76, 77 to the signal responsive solenoid means 67.

The purpose of providing the relay element 110 with the capacitor means 115 and independent battery supply means 111 is to provide an effective means for controlling the pulse width to ensure uniform cyclic operation of the heart pumping means. However, the relay element 110 and capacitor means 115 associated with switch means 108 would not normally be of a capacity which would be capable of transmitting the required amount of voltage for effecting operation of the solenoid means 67. For this reason, additional relay element 104 and switch means 103 are provided with an independent battery powered supply means 107 for effecting operation of the switch means 103 whereby an operable power control signal having the required voltage can be transmitted from an independent battery supply source 102 to the solenoid means 67.

The above described control circuitry including the pulser circuit utilizing the combination of transistors and capacitor, as indicated above, is completely automatic in operation after the manual control switch 127 has been moved to an on current conducting position and will continue to operate to transmit control signals having a predetermined length to thereby effect a simultaneous operation of the relay elements 104, 110 and 120 as described above.

The above described circuitry as pulser control means are capable of being operated through a low capacity DC transistor battery powered supply source which would produce a compact, light weight and reliable power control unit for effecting operation of the implantable heart 10.

It now becomes apparent that the above described illustrative embodiment of the implantable heart 10 and the externally worn power control unit 100 is capable of obtaining the above stated objects and advantages. It is obvious that those skilled in the art may make modifications in the details of construction without departing from the spirit of the invention which is to be limited only by the scope of the appended claims.

What is claimed is:

1. An artificial heart capable of acting as a substitute for a natural heart comprising:

a. a casing constructed of material compatible with the tissue of a living being and of a size to fit within the chest cavity of a living being after removal of the natural heart;

b. tube means on said casing for connection to natural blood vessels of said living being;

c. valve means operatively associated with said tube means for controlling the flow of blood therethrough;

d. pumping means operatively associated with said casing and said tube means for circulating blood through said tube means in simulation of the natural heart; and e. means operatively associated with said pumping means for controlling the cyclic rate of said pumping means, said control means including signal responsive means operable for effecting a cycle of operation of said pumping means, an input supply line electrically connected to said signal responsive means for transmitting an operable control signal thereto, a power supply source, a pair of lead lines electrically connected in parallel fashion between said power supply source and said input supply line, signal conducting switch means electrically connected in series to one of said lead lines and being normally biased to a non-conducting condition, means electrically connected between said switch means and said other lead line for automatically and serially biasing said switch means between alternate conducting and non-conducting conditions in response to input power into said pair of lead lines whereby said switch means will effectively transmit a continuous series of operable control signals having a predetermined length through said input supply line to effect operation of said signal responsive control means to thereby control the cyclic rate of said pumping means, said means electrically connected between said signal conducting switch and said other lead line for automatically and serially biasing said signal conducting switch means between alternate conducting and non-conducting conditions including a pulsating switch means normally biased to a non-conducting condition electrically connected in series between said power supply source and said first switch means, and bias reversing means operatively connected in series with said pulsating switch means and between said signal conducting switch means and said input supply line, said control means including a selectively adjustable resistor means operatively connected in series between said power supply source and said pulsating switch means for adjusting the cyclic rate of said pumping means, said signal conducting switch means including a PNP transistor and said pulsating switch means including an NPN transistor with the base portion of said PNP transistor being electrically connected to the collector portion of said NPN transistor.

2. An artificial heart as described in claim 1 further characterized in that said bias reversing means includes a capacitor electrically connected between said input supply line and the base portion of said NPN transistor, with said selectively adjustable resistor means being electrically connected in series between said power supply source and said base portion of said NPN transistor.

3. A heart power unit capable of being worn externally of the body and connected to a signal responsive means of an artificial heart adapted to be implanted within the body chest cavity and including pumping means, with the power unit operable for controlling the cyclic rate of said pumping means, said power unit including a power supply source, an input supply line electrically operable with the signal responsive pumping means for transmitting an operable control signal thereto, a pair of lead lines electrically connected in parallel fashion between said power supply source and said input supply line, signal conducting switch means electrically connected in series to one of said lead lines and being normally biased to a non-conducting condition, means electrically connected between said signal conducting switch means and said other lead line for automatically and serially biasing said signal conducting switch means between alternate conducting and non-conducting conditions in response to input power from said supply source to said pair of lead lines whereby said signal conducting switch means will effectively and automatically transmit a continuous series of operable control signals having a predetermined length through said input supply line to effect operation of said signal responsive pump operating means to thereby control the cyclic rate of said pumping means, said means electrically connected between said signal conducting switch means and said other lead line for automatically and serially biasing said signal conducting switch means between alternate conducting and non-conducting conditions including a pulsating switch means normally biased to a non-conducting condition electrically connected in series between said power supply source and said pulsating switch means and bias reversing means being operatively connected in series with said pulsating switch means and between said signal conducting switch means and said input supply line, said control means including a selectively adjustable resistor means operatively connected in series between said power supply source and said pulsating switch means for adjusting the cyclic rate of said pumping means, and said signal conducting switch means including a PNP transistor and said pulsating switch means including an NPN transistor with the base portion of said PNP transistor being electrically connected to the collector portion of said NPN transistor.

4. A heart power unit as described in claim 3 further characterized in that said bias reversing means includes a capacitor electrically connected between said input supply line and the base portion of said NPN transistor, with said selectively adjustable resistor means being electrically connected in series between said power supply source and said base portion of said NPN transistor.

5. An artificial heart capable of acting as a substitute for a natural heart comprising:

a. a casing constructed of material compatible with the tissue of a living being and of a size to fit within the chest cavity of a living being after removal of the natural heart;

b. tube means on said casing for connection to natural blood vessels of said living being;

c. valve means operatively associated with said tube means for controlling the flow of blood therethrough;

d. pumping means operatively associated with said casing and said tube means for circulating blood through said tube means in simulation of the natural heart; and, e. means operatively associated with said pumping means for controlling the cyclic rate of said pumping means, said control means including signal responsive means operable for effecting a cycle of operation of said pumping means, an input supply line electrically connected to said signal responsive means for transmitting an operable control signal thereto, a power supply source, a pair of lead lines electrically connected in parallel fashion between said power supply source and said input supply line, signal conducting switch means electrically connected in series to one of said lead lines and being normally biased to a non-conducting condition, means electrically connected between said switch means and said other lead line for automatically and serially biasing said switch means between alternate conducting and non-conducting conditions in response to input power into said pair of lead lines whereby said switch means will effectively transmit a continuous series of operable control signals having a predetermined length through said input supply line to effect operation of said signal responsive control means to thereby control the cyclic rate of said pumping means, said pumping means including a reciprocally operable power means and said signal responsive means being operable for effecting a reciprocating cycle of operation of said power means, with means operatively associated with said signal responsive means for controlling the length of signal transmitted to said reciprocally operable power means to thereby ensure uniform cyclic operation of said pumping means; said reciprocally operable power means including a solenoid and said signal responsive control means including relay means operatively associated with said solenoid for transmitting a control signal to effect operation of said solenoid in said pumping operation, said relay means including a relay element and a capacitor connected in parallel therewith.

6. An artificial heart as described in claim 5 further characterized in that said relay means includes a number of relay elements electrically connected in series fashion and collectively operable for transmitting an operable control signal to said solenoid.

7. An artificial heart as described in claim 6 further characterized in that each of said relay elements include independent power supply means operatively associated therewith.

* * * * *